(No Model.) 6 Sheets—Sheet 1.

W. MASON.
BOX MAGAZINE FIREARM.

No. 551,592. Patented Dec. 17, 1895.

Witnesses,
J. H. Shumway
Lillian D. Kelsey

William Mason
Inventor
By atty
Earle & Seymour

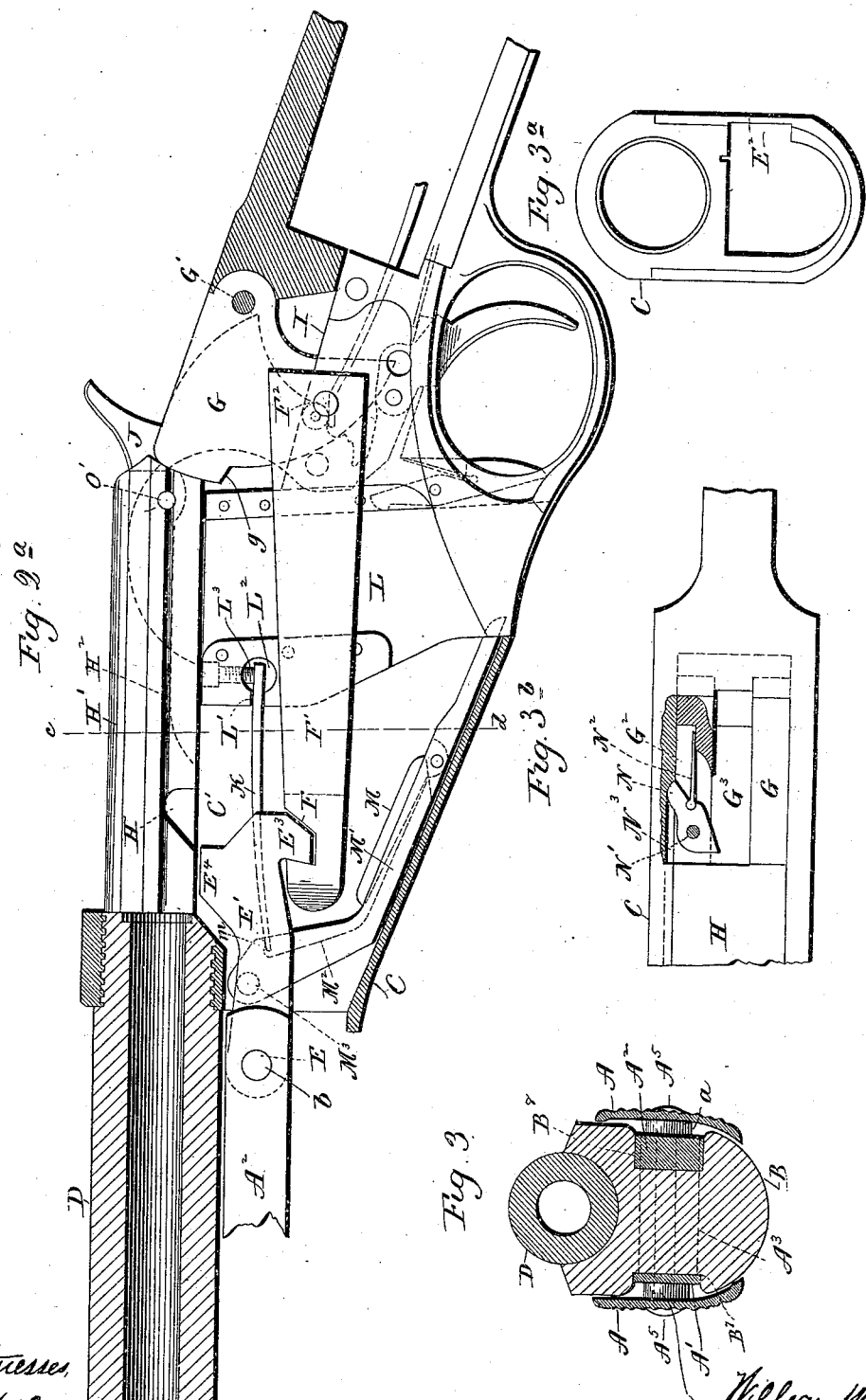

(No Model.) 6 Sheets—Sheet 3.
W. MASON.
BOX MAGAZINE FIREARM.
No. 551,592. Patented Dec. 17, 1895.
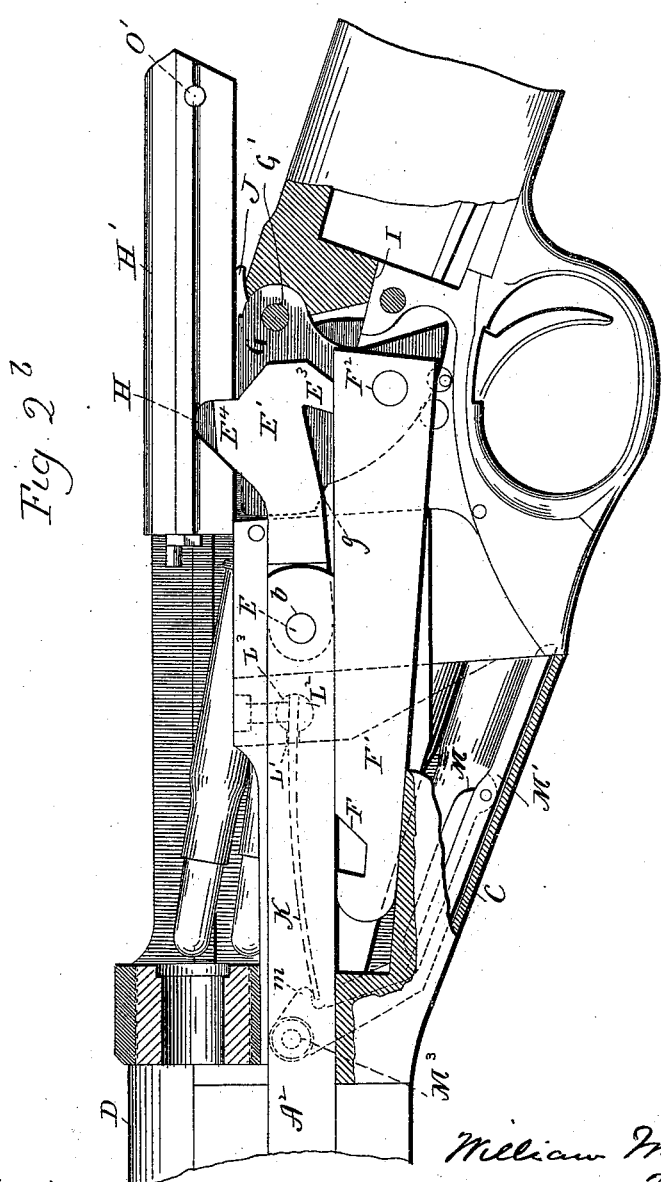

(No Model.) 6 Sheets—Sheet 4.
W. MASON.
BOX MAGAZINE FIREARM.
No. 551,592. Patented Dec. 17, 1895.
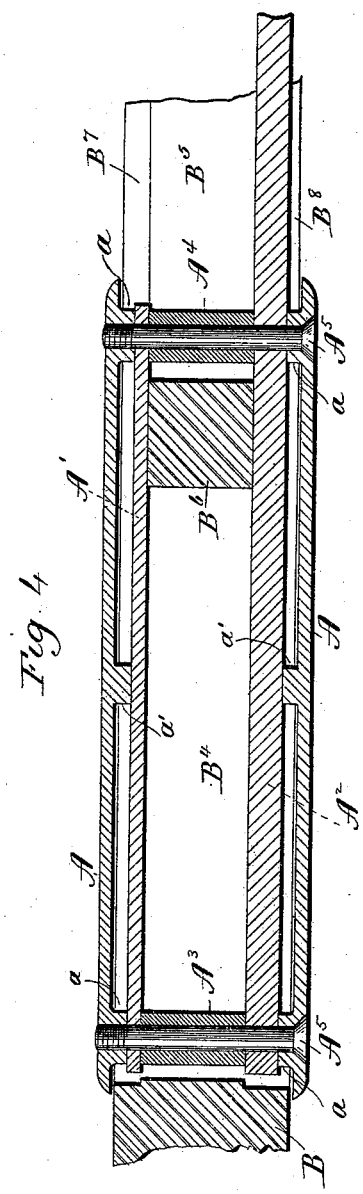
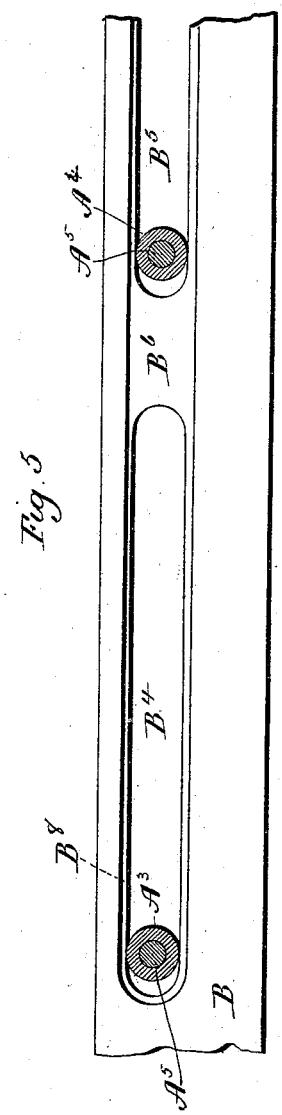
Witnesses
J. H. Shumway
Lillian D. Kelsey
William Mason
Inventor
By atty
Earle Seymour (No Model.) 6 Sheets—Sheet 5.
W. MASON.
BOX MAGAZINE FIREARM.
No. 551,592. Patented Dec. 17, 1895.
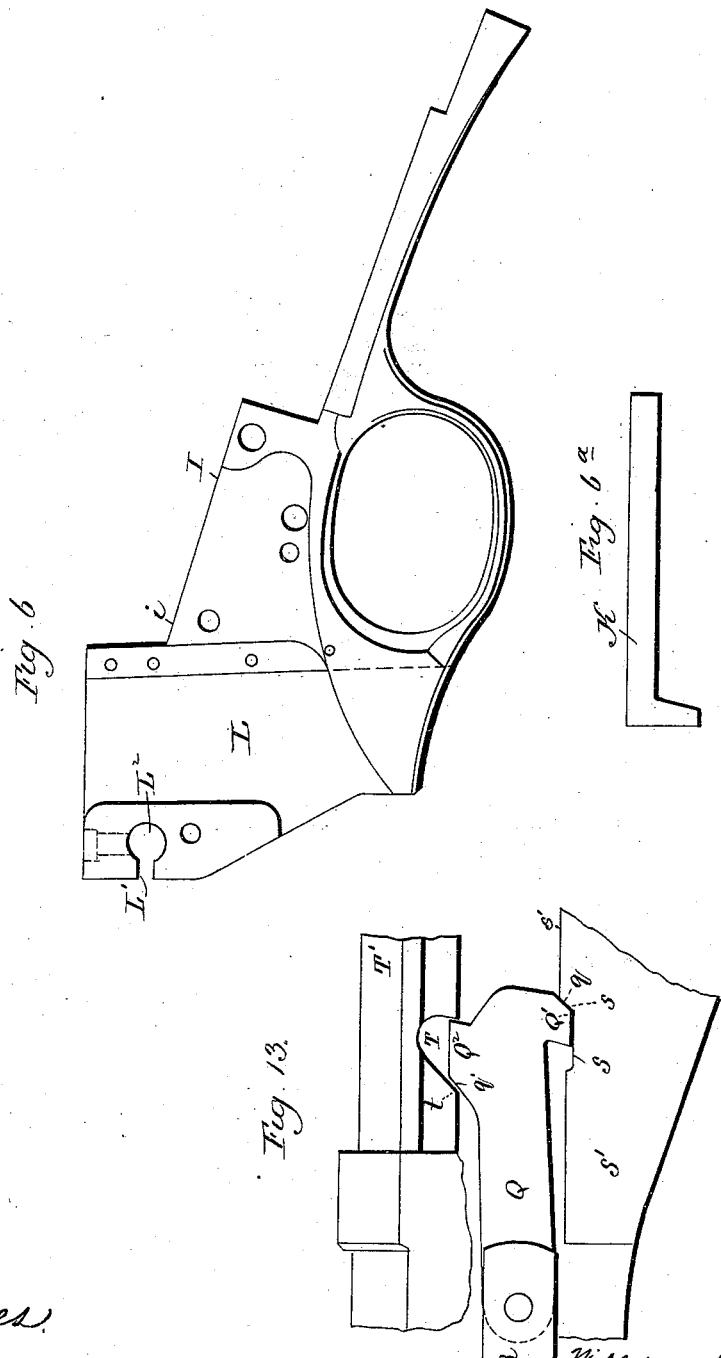

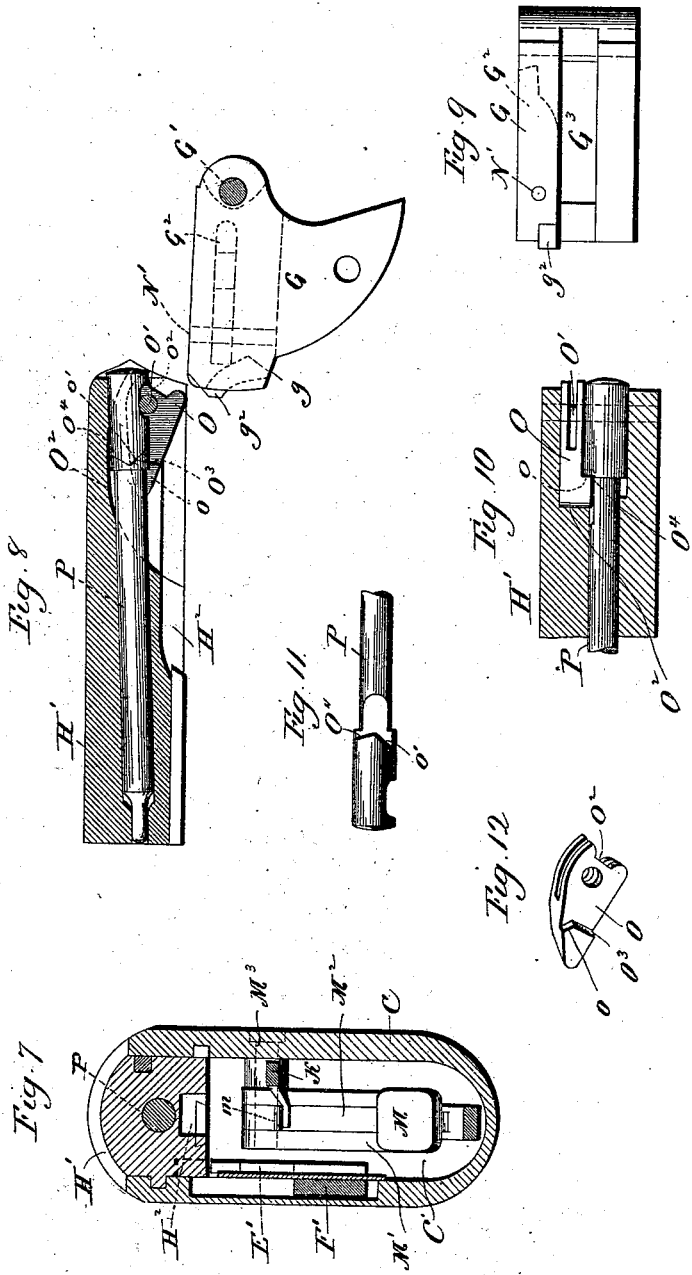

UNITED STATES PATENT OFFICE.

WILLIAM MASON, OF NEW HAVEN, CONNECTICUT, ASSIGNOR TO THE WINCHESTER REPEATING ARMS COMPANY, OF SAME PLACE.

BOX-MAGAZINE FIREARM.

SPECIFICATION forming part of Letters Patent No. 551,592, dated December 17, 1895.

Application filed April 5, 1895. Serial No. 544,663. (No model.)

*To all whom it may concern:*

Be it known that I, WILLIAM MASON, of New Haven, in the county of New Haven and State of Connecticut, have invented a new Improvement in Breech-Loading Box-Magazine Firearms; and I do hereby declare the following, when taken in connection with the accompanying drawings and the letters of reference marked thereon, to be a full, clear, and exact description of the same, and which said drawings constitute part of this specification, and represent, in—

Figure 1:
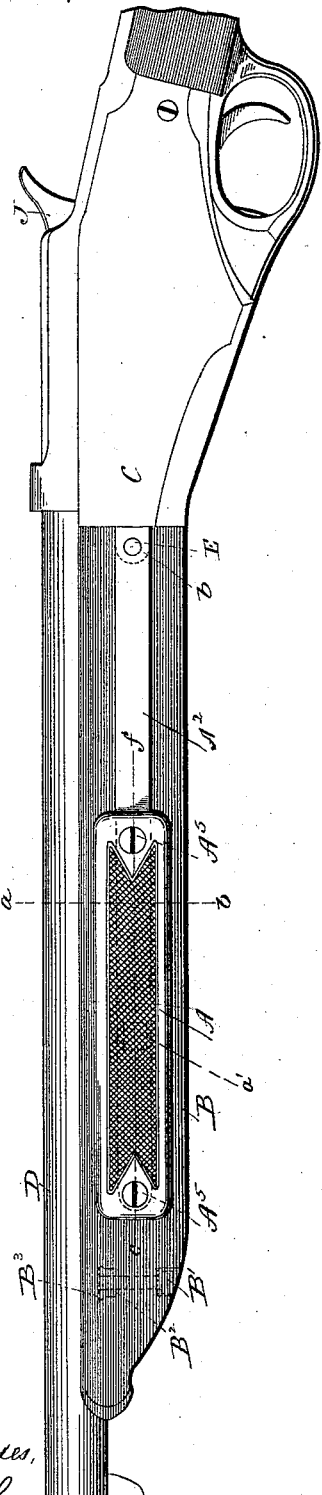
Figure 2:

Figure 1, a broken view, partly in side elevation and partly in vertical section, of one form which a gun constructed in accordance with my invention may assume; Fig. 2, a broken plan view of the arm; Fig. 2ª, a broken view of the arm, partly in side elevation and partly in central longitudinal section, with the action mechanism shown in its closed position; Fig. 2ᵇ, a similar view showing the parts of the action mechanism in their open positions; Fig. 3, an enlarged view in transverse section on the line $a\,b$ of Fig. 1; Fig. 3ª, a detached view in front elevation of the frame of the arm; Fig. 3ᵇ, a broken plan view of the arm with the hammer removed and showing the safety-dog, for which purpose the frame and recoil-block are partially represented in horizontal section; Fig. 4, a broken horizontal section on the line $e\,f$ of Fig. 1, showing the application of the sliding handle to the fore-stock; Fig. 5, a broken view in side elevation of the fore-stock with the sleeves and screws by which the sliding handle is secured thereto represented in transverse section; Fig. 6, a detached view in side elevation of the lower tang, which is constructed at its forward end with a pack-receiving box-magazine; Fig. 6ª, a detached view of the carrier-spring which is mounted in the said magazine; Fig. 7, a view in transverse section on the line $c\,d$ of Fig. 2ª, looking forward; Fig. 8, a detached view of the breech-bolt and recoil-block, the former being shown in central longitudinal section and the latter in side elevation; Fig. 9, a detached plan view of the recoil-block; Fig. 10, a broken view in horizontal section of the breech-bolt, showing the combined firing-pin retractor and locking-dog in place; Fig. 11, a broken view in side elevation of the firing-pin, showing the rear end thereof; Fig. 12, a detached perspective view of the said combined firing-pin retractor and locking-dog; Fig. 13, a broken view in side elevation, showing a modification of the action-hook.

My invention relates to an improvement in breech-loading box-magazine firearms, the object being to produce a compact, durable, reliable, and effective arm constructed with particular reference to the operation of the action mechanism of a box-magazine gun by means of a handle moving in line with the gun-barrel and located forward of the action mechanism.

With these ends in view my invention consists in a sliding handle comprising two independently-formed gripping-plates respectively applied to the opposite faces of the fore-stock and connected together, the said handle being also connected with the action mechanism of the arm, in front of which it is located.

My invention further consists in an action-hook pivotally connected at its forward end with a sliding handle and coacting at its rear end with the action mechanism of the arm for moving the breech-bolt thereof both back and forth.

My invention further consists in a gun having its frame constructed with a receiver-chamber, a box-magazine located in the said chamber, a vertically-oscillating carrier located in the said box-magazine, a fixed fore-stock connected at its rear end with the forward end of the frame and at its forward end with the gun-barrel, a sliding handle applied to the said fore-stock and movable back and forth thereon, action mechanism including a breech-bolt, and connection between the said sliding handle and action mechanism, whereby the said bolt is moved back and forth as the handle is moved back and forth.

My invention further consists in the combination, with a sliding handle moving in a line parallel with the longitudinal axis of the gun-barrel, located forward of the action mechanism of the arm and having a rearwardly-extending action-bar, of an action-hook pivotally connected with the rear end of the bar, an action-slide adapted to be operated back and forth by the action-hook, a recoil-block connected with the rear end of the slide and operated thereby, and a breech-bolt, also adapted to be operated back and forth by the action-hook when the same is disengaged from the slide.

My invention further consists in the combination, in a box-magazine gun, with a carrier constructed and arranged to lift the cartridges upward in the box-magazine, of a carrier-spring located to one side of the carrier, connected at its forward end with the forward end of the same and mounted at its rear end in one of the side walls of the box-magazine.

My invention further consists in the combination, with an oscillating recoil-block having one of its side walls recessed and containing a central slot or clearance-space in which the hammer plays, of a safety or locking dog pivotally mounted in the recess of the recoil-block and adapted at its inner end to extend into the clearance-space thereof and at its outer end to enter a recess formed in the adjacent side wall of the frame of the gun, and a spring for throwing the said dog into its locked position, from which it is thrown into its unlocked position by the action of the hammer itself.

My invention further consists in the combination, with a breech-bolt, a firing-pin located therein, and a recoil-block, of a combined firing-pin retractor and locking-dog mounted in a recess in the breech-bolt in position to coact with the firing-pin and to be engaged by the said recoil-block, which turns it in one direction and the other on its pivot.

My invention further consists in certain details of construction and combinations of parts, as will be hereinafter described, and pointed out in the claims.

In carrying out my invention as herein shown, I employ a skeleton sliding handle, comprising two corresponding transversely-bowed gripping-plates A A, having their outer surfaces roughened by being checked or knurled, and made as light as possible consistent with the required strength. The said handle also comprises a flat coupling-bar $A'$, an action-bar $A^2$, two sleeves $A^3$ and $A^4$, and two screws $A^5$ $A^5$. The said screws pass through the ends of the said plates, through the coupling and action bars, and through the sleeves, as shown in Figs. 2 and 3, whereby the said parts are firmly united together and form what I call a "skeleton" handle, which is not only an operating-handle, as it operates the breech-mechanism, but also a supporting-handle, as it assists the sportsman in supporting the arm while he is using the same. The said handle is applied to a fixed fore-stock B, reduced at its rear end and inserted into the open forward end of the frame C, and having its forward end adapted to receive a vertically-arranged screw $B'$, the upper end of which is screwed into a block $B^2$, inserted into a transverse groove $B^3$, formed at a suitable point in the lower face of the gun-barrel D. I would call attention to the fact that the said fore-stock is entirely independent of the butt-stock $B^8$, which is separated from the fore-stock by the frame C of the arm, which, under this construction, becomes light in weight and convenient and elegant in shape. The said gripping-plates and fore-stock are shaped so that the lower edge of the latter extends below the lower edges of the plates, which are separated from each other, and conform to it in curvature, as shown in Fig. 3. To adapt the fore-stock to receive the skeleton handle, it is constructed, as shown, with two long horizontally-arranged longitudinal slots $B^4$ and $B^5$, extending transversely through it and separated from each other by a web or tie $B^6$, which strengthens the fore-stock and prevents it from splitting; but I may, if preferred, employ a single long slot, instead of two slots separated by a web or tie. In the construction shown the forward sleeve $A^3$ is located in the slot $B^4$, while the rear sleeve $A^4$ is located in the slot $B^5$. The coupling-bar $A'$ and the action-bar $A^2$ have direct bearing upon the ends of the said sleeves, and the gripping-plates bear upon the outer faces of the respective bars, the said plates being constructed for the purpose of such bearing with inwardly-projecting hubs $a$ located at their ends, as shown in Fig. 4.

For the reception and clearance of the coupling-bar $A'$ the right-hand side of the fore-stock is constructed with a long recess $B^7$, which begins at the forward end of the forward slot $B^4$, and thence extends rearward through the extreme rear end of the fore-stock, though this is not essential, so long as the recess is long enough to clear the rear end of the coupling-bar when the handle is moved back and forth. For the reception and clearance of the action-bar, the left-hand side of the fore-stock is constructed with a long recess $B^8$, which begins at the forward end of the forward slot $B^4$ and extends thence rearward through the rear end of the fore-stock. These recesses, it will be understood, coincide with the slots $B^4$ and $B^5$, which open into them. It is designed that, under the construction described, the gripping-plates shall be supported in positions in which their edges will just clear the opposite faces of the fore-stock, as shown in Fig. 3, and to prevent the plates from springing inward they are preferably constructed midway of their length with inwardly-projecting lugs $a'$ $a'$, which engage with the outer faces of the coupling-bar and action-bar respectively.

A handle constructed as thus described has the merit of being extremely light and is entirely independent of the gun-barrel, which may then be of any shape in cross-section, so far as the handle is concerned, and also obviates the necessity of using a tubular magazine as a support for the handle, for it is to be understood that heretofore sliding handles, moving in a line parallel with the longitudinal axis of the barrel of an arm and located in front of the action mechanism thereof, have generally been constructed either to embrace the barrel itself or to slide upon a tubular magazine located either above, below, or to one side of the barrel; but under my construction of providing the gun with a rigid fore-stock and handle I am enabled to employ a sliding skeleton handle with a gun of the box-magazine type. It is not essential, however, to my invention that either the forestock or the sliding handle be constructed exactly as shown and described.

The rear end of the action-bar is furnished with a transverse hole $b$, receiving an outwardly-projecting pin E, Figs. 1 and 2$^a$, mounted in the forward end of an action-hook E', entering at its forward end a recess E$^2$, Fig. 3$^a$, formed in the left-hand wall of the forward portion of the frame C, the said portion of the frame being constructed with a chamber C' and commonly known as the "receiver-chamber." At its rear end the action-hook is constructed with a beveled depending nose E$^3$, adapted to take into a beveled notch F formed in the forward end of an action-slide F', Fig. 2$^a$, supported in part in a recess formed in the left-hand wall of the receiver and in line with the action-hook and action-bar. The rear end of this slide is connected by means of a screw F$^2$, Fig. 2$^a$, with the lower portion of an oscillating recoil-block G, which is suspended upon a horizontal pin G', the ends of which extend into the side walls of the frame. The said hook is also constructed at its rear end with an upwardly-projecting beveled nose E$^4$, which takes into a suitable notch H formed in the forward end of the lower face of the breech-bolt H'. The said action-hook positively operates the recoil-block in both directions through the medium of the action-slide, and positively operates the breech-bolt in both directions through its direct engagement therewith, these two functions of the action-hook being exercised alternately. Thus, supposing the gun to be closed, as shown in Fig. 2$^a$, the action-hook will, at the beginning of the opening movement of the gun, push the action-slide rearward and cause the same to draw the pivotal recoil-block down, so as to clear it from the rear end of the breech-bolt H', the action-hook being maintained in engagement with the action-slide during this time by the engagement of the flat upper face of its upwardly-projecting nose E$^4$ with the extreme forward end of the lower face of the breech-bolt. The described rearward movement of the action-slide is stopped by the striking of the face $g$, Fig. 8, of the recoil-block upon the upper face $i$, Fig. 6, of the lower tang I. As soon as the recoil-block has struck the tang, as described, the action-hook will be swung upward on its pivot or pin E, so as to enter its upwardly-projecting beveled nose E$^4$ into the notch H of the breech-bolt H' by the riding of the beveled depending nose E$^3$ of the hook up out of the beveled notch F in the forward end of the slide, the upwardly-projecting nose E$^4$ of the hook being located directly under the notch H at the time the rearward movement of the slide is arrested. After the lug E$^4$ has been fully entered into the notch H by sliding up the incline in the notch F the hook is maintained in engagement with the breech-bolt by the riding of the flat lower face of the depending nose E$^3$ upon the upper edge of the slide F'. The hook now operates to push the breech-bolt backward into its open position and until its rearward movement is arrested by the striking of the forward end wall of the longitudinal groove H$^2$, formed in the lower face of the breech-bolt, against the hammer J, which has meanwhile been thrown back into its fully-cocked position by the breech-bolt in the rearward movement thereof. Now when the closing movement of the gun is begun the hook, which is then drawn forward by the sliding handle through the medium of the action-bar, draws the breech-bolt positively forward into its fully-closed position, after reaching which the forward bevel of the notch H coacts with the forward bevel of the upwardly-projecting nose E$^4$ and forces the hook to swing downward so as to enter its depending nose E$^3$ into the notch F of the action-slide F', the notch F being at this time under the depending nose. The hook continuing to move forward for a short distance, under the continued forward movement of the handle, then draws the action-slide forward, and the action-slide, in turn, swings the oscillating recoil-block upward behind the rear end of the breech-bolt, which it locks in its closed position. I may remark that the action-slide itself has not only a sliding movement, but also a slight swinging movement, which it is necessary that it should have, so that it may partake of the oscillating movement of the recoil-block. It will be noted that by means of the action hook and slide I am enabled to positively operate in both directions not only the recoil-block, but also the breech-bolt, and thus secure a simple and reliable construction. The construction described also affords very convenient means of connecting the sliding handle with the breech-bolt and recoil-block.

The next feature of my invention to be described is the carrier-spring K, Fig. 6$^a$, which is arranged to exert a normal effort to lift the cartridges upward in the box-magazine L, which is designed, in the gun shown, to receive a suitable pack, into which the cartridges are introduced before the introduction of the pack into the magazine; or the box-magazine might be constructed to have the cartridges charged directly into it from the hand. As herein shown, the carrier consists of a plate M, pivoted at its rear end to a carrier-arm M' and maintained in right position by an equalizing-lever M$^2$, constructed at its forward end with a rearwardly-projecting undercut lug $m$, which is engaged with the inwardly-projecting finger K of the spring, the carrier-arm and equalizing-lever being both hung upon a screw M³ mounted in the forward end of the frame. The main body of the spring is located adjacent to the right-hand side wall of the frame, and is entered at its extreme rear end into a horizontal slot L' formed in the right-hand side wall of the box-magazine L, which, as shown, is formed integral with the forward end of the lower tang I. The slot L' opens into a recess L², which receives the extreme rear end of the spring and also a tension-screw L³, mounted in the said wall of the magazine and impinging at its lower end upon the spring, the tension of which it thus controls. The spring is thus virtually located within the chamber C' of the receiver, but in such position in the said chamber that it entirely clears the cartridges as they are being fed upward. I thus provide for locating the carrier-spring within the frame of the arm, instead of forward of the same under the butt-end of the gun-barrel, as is commonly done.

The next feature of my invention to be described is a safety-dog N, which is located in a horizontal recess G² formed to receive it in the right-hand side of the recoil-block, the said dog being mounted in the said recess upon a vertically-arranged pivot or pin N'. The said recess G² extends clear through the said wall of the recoil-block and opens into the vertical clearance-space G³ formed therein for the reception and play of the hammer J. A small spring N², located in the said recess, engages with the dog and exerts a constant effort to throw its beveled or pointed forward or inner end out into the space G³ and its rear or outer end or tail into a recess N³, formed in the right-hand wall of the frame, in position to receive the tail of the dog when the recoil-block is in its elevated position. It will be understood that when the recoil-block is in its elevated position, this dog locks it in such position, and not only locks the recoil-block in its closed position and hence the breech-bolt, but also, through the medium of the action-slide and action-hook and action-bar, locks the handle, so that the handle cannot be drawn back until the recoil-block has been unlocked, which can only be done by the action of the hammer itself in moving forward in the space G³ in the recoil-block, whereby its forward edge engages with the beveled inner end of the dog and swings the same around so as to clear its outer end or tail from the recess in the frame, and thus release the recoil-block to permit it to be swung down out of the way of the breech-bolt. The recoil-block is thus prevented from being moved at all from its elevated operative position except as it is released by the hammer in firing the gun, or released by letting the hammer carefully down into its down position under the restraint of the hand. The firing of the gun with the recoil-block in any but its proper position is thus prevented. If it were not for the use of this safety-dog, or some equivalent of it, the action-handle might be moved back sufficiently to start the recoil-block in its downward movement before the firing of the gun, which might then occur without the full resisting action of the recoil-block.

The last feature of my invention to be described is the combined firing-pin retractor and locking-dog O, Figs. 8, 10, 11 and 12, which is hung upon a horizontal pin O' in a vertical groove O² formed in the rear end of the lower face of the breech-bolt H', the rear end of the dog being bifurcated, as shown in Fig. 10, to form two frictional fingers, the outer faces of which engage with the side walls of the groove or cut O² in the breech-bolt, whereby the dog is held in its elevated or depressed position by the action of friction. At its forward end the dog is furnished with a beveled retracting-face o, which coacts with a beveled retracting-surface o' formed upon the rear end of the firing-pin P, which is positively retracted by the dog O through the medium of its surface o, when the forward end of the dog is lifted by the depression of its rear end through the medium of the recoil-block, which is provided for the purpose with a pin or projection g², entering a suitable notch o², formed in the rear end of the dog. The firing-pin being thus positively retracted by the dog, in the manner described, is held in its retracted position by the vertical locking-surface o³ of the dog, the said surface being lifted directly in front of the point o⁴ of the firing-pin P. It will be understood that the dog is held in its elevated locking position by means of the friction of its spring-fingers. Then the inertia acquired by the firing-pin, in the quick-closing movement of the breech-bolt, cannot operate to shoot the firing-pin forward so as to prematurely explode the cartridge, inasmuch as the firing-pin is not released by the dog until after the breech-bolt has reached its fully-closed position, after which the recoil-block rises, bringing with it the projection or pin g², which strikes the upper wall of the notch o² in the dog, and thus elevates the rear end thereof and depresses its forward end, whereby its said forward end is cleared from the firing-pin, which is thereafter free to be shot forward for the explosion of the cartridge by the action of the hammer. I do not claim a combined retractor and locking-dog mounted in the breech-bolt and having frictional engagement therewith, but only such a dog when positively operated by means of an oscillating recoil-block.

It is apparent that in carrying out my invention some changes from the construction herein shown and described may be made. It is apparent also that the several features of my invention may be used in combination in one gun, or that one or more of them may be used, as may be found desirable. Thus a box-magazine gun, having its action mechanism operated by a sliding handle, might be provided with entirely different means from those shown for retracting and locking the firing-pin, for instance, and for locking the recoil-block in its closed position. If desired, I may dispense with the recoil-block altogether, as shown in Fig. 13, in which the action-hook Q, which is pivotally connected with the rear end of the action-bar R, is constructed at its rear end with a depending lug Q' and with an upwardly-extending lug Q², the former having a bevel-face $q$, and the latter having a bevel-face $q'$ located diagonally opposite the bevel-face $q$. The depending lug Q' enters a notch S in the frame S', while the upwardly-extending lug Q² enters a notch T in the breech-bolt T'. When the gun is opened and the action-hook begins to move rearward, the bevel-face $q$ of its depending lug Q' rides up out of the notch S over the beveled rear end wall $s$ thereof, at which time the upwardly-extending lug Q² rises in position in the notch T, which is made especially deep for the purpose. The opening movement of the gun continuing, the action-hook pushes the breech-bolt into its open position, the hook being at this time maintained in its elevated position by the riding of its depending lug Q' upon the horizontal ledge $s'$ of the frame. When the closing movement of the gun takes place, the bevel $q'$ of the upwardly-extending lug Q² engages with the forward wall $t$ of the notch T in the breech-bolt, which is therefore compelled to slide forward, the action-hook being maintained in its elevated position by the riding of the depending lug Q' upon the ledge $s$ during the forward movement of the breech-bolt and action-hook until the former is brought into its closed position, when the hook drops down into the notch S, at which time the bevels Q and $s$ and Q' and $t$ coact so as to lock the breech-bolt in its said closed position. Under the construction described it will be seen that I dispense with the use of a recoil-block. I would therefore have it understood that I do not limit myself to the exact construction shown and described, but hold myself at liberty to make such changes and alterations as fairly fall within the spirit and scope of my invention.

Having fully described my invention, what I claim as new, and desire to secure by Letters Patent, is—

1. In a box-magazine fire-arm, the combination with the frame, butt-stock and barrel thereof, of a rigid fore-stock formed independently of the butt-stock, separated therefrom by the frame into the forward end of which its rear end is inserted, and having its forward end connected with the gun-barrel; a sliding handle comprising two independently formed gripping plates respectively applied to the opposite faces of the fore-stock above the lower edge thereof, means extending through the fore-stock for connecting the said plates rigidly together, and action-mechanism connected with and operated by the said handle, which is movable back and forth upon the fore-stock, substantially as described.

2. In a box-magazine fire-arm, the combination with a sliding handle, of a breech-bolt, a recoil-block for locking the breech-bolt in its closed position by engaging with the rear end thereof, an action-hook pivotally connected at its forward end with the sliding handle, and operating at its rear end to move the breech-bolt back and forth, and to operate the recoil-block in locking the breech-bolt in its closed position, substantially as described.

3. In a box-magazine fire-arm, the combination with the frame, butt-stock and barrel thereof, of a rigid fore-stock made independently of the butt-stock from which it is separated by the frame, into the forward end of which its rear end is set, having its forward end connected with the gun-barrel, and constructed with one or more horizontally arranged longitudinal slots; a skeleton handle comprising two independently formed gripping-plates applied to the opposite faces of the fore-stock above the lower edge thereof, means extending through the said slot or slots in the fore-stock for uniting the respective ends of the said plates, and a rearwardly extending action-bar entering the said frame, located in a recess formed in one face of the fore-stock, and connected at its forward end with one of the said plates and hence with the handle, substantially as set forth.

4. In a box-magazine fire arm, the combination with a rigid fore-stock, of a sliding handle, comprising two plates, respectively applied to the opposite faces of the fore-stock, a coupling-bar and an action-bar located under the respective plates, and one or more sleeves interposed between the bars and plates, which are connected with the opposite ends of the sleeve or sleeves, which the fore-stock is constructed to clear to permit the handle to be slid back and forth, substantially as set forth.

5. In a box-magazine fire arm, the combination with a longitudinally slotted fore-stock, of two gripping-plates applied to the opposite faces thereof, an action-bar and a coupling-bar located under the said plates, two transversely arranged sleeves located in the slotted portion of the fore-stock and between the ends of the plates, and screws passing through the said sleeves and bars and plates for coupling the same together, substantially as set forth.

6. In a box-magazine fire-arm, the combination with a rigid fore-stock constructed with two horizontally arranged longitudinal slots, of a sliding handle, comprising two gripping-plates applied to the opposite faces of the fore-stock, an action-bar and a coupling-bar located adjacent to the inner faces of the plates and situated in recesses formed in the sides of the fore-stock in line with the slots thereof, transversely arranged sleeves located in the respective slots and interposed between the ends of the plates and between the bars, and transversely arranged screws connecting the ends of the plates with the bars and sleeves, substantially as set forth.

7. In a box-magazine fire arm, the combination with a sliding handle, moving in a line parallel with the longitudinal axis of the gun-barrel, located forward of the action mechanism of the arm, and having a rearwardly extending action-bar, of an action-hook pivotally connected with the rear end of the said bar, an action-slide adapted to be operated back and forth by the action-hook, a recoil-block connected with the rear end of the slide and operated thereby, and a breech-bolt also adapted to be operated back and forth by the action-hook when the same is disengaged from the slide, substantially as set forth.

8. In a box-magazine fire arm, the combination with a sliding handle, moving in a line parallel with the longitudinal axis of the gun-barrel, located forward of the action mechanism of the arm, and having a rearwardly extending action-bar; of an action-hook pivotally connected with the rear end of the said bar, an action-slide adapted to be operated back and forth by the action-hook, which engages directly with it, a recoil-block connected with the said slide, and a breech-bolt, also adapted to be directly engaged by the action-hook and operated back and forth thereby when the same is disengaged from the slide, substantially as set forth.

9. In a box-magazine fire arm, the combination with a sliding handle, moving in a line parallel with the longitudinal axis of the gun-barrel, located forward of the action mechanism of the arm, and having a rearwardly extending action-bar, of an action-hook pivotally connected with the rear end of the said bar, and constructed with an upwardly extending and also a depending nose, an action-slide having its forward end notched to receive the said depending nose, a recoil-block connected with the rear end of the slide and operated thereby, and a breech-bolt adapted to receive the upwardly extending nose of the action-hook when the same is disengaged from the slide, substantially as set forth.

10. In a box-magazine fire arm, the combination with the box-magazine thereof, of a vertically movable pivotal carrier adapted to lift the cartridges upward in the said magazine, a flat carrier-spring connected at its forward end with the carrier and having its rear end mounted for adjustability of tension in one of the side walls of the box-magazine, and a screw mounted in the said wall of the box-magazine and impinging upon the forward end of the said flat carrier-spring, substantially as set forth.

11. In a box-magazine fire arm, the combination with a pivotal or oscillating recoil-block, constructed with a vertical clearance space, of a hammer entering the said space and moving back and forth therein, and a pivotal, spring-actuated safety dog, mounted in a recess in the block and adapted at its inner end to extend into the said space in position to be engaged and pushed to one side when the hammer moves forward, and constructed at its outer end with a tail adapted to take into a recess formed in the adjacent side wall of the frame of the arm, and located in position to receive the said tail of the dog when the recoil-block is in its fully closed position, substantially as set forth.

12. In a magazine fire-arm, the combination with the breech-bolt thereof, of a firing-pin located therein, a pivotal recoil-block which engages with the rear end of the breech-bolt for locking the same in its closed position, and a combined firing-pin-retractor and locking-dog mounted in a recess in the rear end of the breech-bolt coacting with the firing-pin and engaged and thrown in one direction and the other on its pivot by means of the recoil-block which positively operates the said dog in both directions, substantially as described.

13. In a magazine fire arm, the combination with a breech-bolt, of a firing pin located therein, a pivotal recoil-block moving in a vertical plane, a combined firing-pin-retractor and locking dog mounted in a recess in the breech-bolt, in position to coact with the firing pin, and having its rear end notched to receive a projection formed upon the recoil-block, which positively swings the dog in a vertical plane in either direction, to throw it into and out of operation respectively, substantially as set forth.

14. In a box-magazine fire-arm, the combination with a sliding supporting and operating handle, moving back and forth in line with the gun-barrel; of a breech-bolt, and an action-hook pivotally connected at its forward end with the said handle, and constructed with an upwardly projecting beveled nose taking into a notch formed in the breech-bolt which is positively moved back and forth by the hook under the action of the slide, substantially as described.

15. In a box-magazine fire-arm, the combination with a sliding supporting and operating handle moving back and forth in line with the gun-barrel, of a breech-bolt, and an action-hook pivotally connected at its forward end with the sliding handle, and constructed at its rear end with an upwardly projecting beveled nose taking into a notch formed in the lower face of the breech-block, and also with a downwardly projecting beveled nose, through the medium of which its upwardly projecting nose is lifted into the said notch, substantially as described.

In testimony whereof I have signed this specification in the presence of two subscribing witnesses.

WILLIAM MASON.

Witnesses:
DANIEL H. VEADER,
WILLIAM S. BALDWIN.